(12) United States Patent
Yoshimoto et al.

(10) Patent No.: US 11,920,808 B2
(45) Date of Patent: Mar. 5, 2024

(54) ENERGY MANAGEMENT SYSTEM AND ENERGY MANAGEMENT METHOD

(71) Applicants: Hitachi, Ltd., Tokyo (JP); The University of Tokyo, Tokyo (JP)

(72) Inventors: Naoki Yoshimoto, Tokyo (JP); Yasunori Akashi, Tokyo (JP); Shinichi Warisawa, Tokyo (JP); Jongyeon Lim, Tokyo (JP); Shohei Miyata, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 380 days.

(21) Appl. No.: 17/241,570

(22) Filed: Apr. 27, 2021

(65) Prior Publication Data
US 2021/0372649 A1 Dec. 2, 2021

(30) Foreign Application Priority Data
May 28, 2020 (JP) ................................ 2020-093535

(51) Int. Cl.
*F24F 11/46* (2018.01)
*F24F 11/52* (2018.01)
(Continued)

(52) U.S. Cl.
CPC .............. *F24F 11/46* (2018.01); *F24F 11/52* (2018.01); *F24F 11/54* (2018.01);
(Continued)

(58) Field of Classification Search
None
See application file for complete search history.

(56) References Cited

U.S. PATENT DOCUMENTS

2008/0179411 A1* 7/2008 Park .................... F24F 11/30
236/51
2014/0374496 A1 12/2014 Miura et al.
(Continued)

FOREIGN PATENT DOCUMENTS

JP 2002-135977 A 5/2002
JP 2015-4480 A 1/2015

OTHER PUBLICATIONS

Jongyeon Lim, et al., "Hierarchical Bayesian modeling for predicting ordinal responses of personalized thermal sensation: Application to outdoor thermal sensation data", Building and Environmental 142, 2018, p. 414-426.

*Primary Examiner* — Kenneth M Lo
*Assistant Examiner* — Istiaque Ahmed
(74) *Attorney, Agent, or Firm* — Mattingly & Malur, PC

(57) ABSTRACT

An energy management system is configured to calculate a percentage of satisfied based on the report data for each of the plurality of buildings; create, for each of the plurality of buildings, a plan for operating each of the air-conditioning facilities based on the percentage of satisfied and a predetermined target percentage of satisfied; calculate a first energy consumption amount based on the first piece of data; calculate a second energy consumption amount based on the second piece of data, the third piece of data, and the fourth piece of data, the second energy consumption amount being obtained when the each of the air-conditioning facilities is operated after a lapse of a predetermined time period; and control, when the first energy consumption amount is larger than the second energy consumption amount, the operation of the each of the air-conditioning facilities so as to achieve the second energy consumption amount.

7 Claims, 11 Drawing Sheets

(51) Int. Cl.
    *F24F 11/54*       (2018.01)
    *F24F 120/20*      (2018.01)
    *F24F 140/60*      (2018.01)
    *F24F 110/10*      (2018.01)
    *F24F 110/20*      (2018.01)
    *F24F 110/30*      (2018.01)

(52) U.S. Cl.
    CPC ....... *F24F 2110/10* (2018.01); *F24F 2110/20* (2018.01); *F24F 2110/30* (2018.01); *F24F 2120/20* (2018.01); *F24F 2140/60* (2018.01)

(56) References Cited

U.S. PATENT DOCUMENTS

2017/0211837 A1\* 7/2017 Gupta ................. G05D 23/1934
2017/0328595 A1\* 11/2017 Iwasaki .................... F24F 11/30
2021/0131693 A1\* 5/2021 Rucco ..................... F24F 11/56

\* cited by examiner

ENERGY MANAGEMENT SYSTEM AND ENERGY MANAGEMENT METHOD

CLAIM OF PRIORITY

The present application claims priority from Japanese patent application JP 2020-093535 filed on May 28, 2020, the content of which is hereby incorporated by reference into this application.

BACKGROUND

This invention relates to a system and method for managing energy.

In recent years, spread and expansion of renewable energies for reducing greenhouse gases have continued. Of the renewable energies, variable renewable energies (VREs), in particular, energies from wind power generation and solar power generation, are pointed out as requiring to have a supply-demand balance adjusted in a mode that does not depend on fossil fuels for thermal power generation, which have hitherto been adopted, in accordance with variations in energy supply.

In recent years, business sectors of, for example, office buildings, commercial facilities, and public facilities have shown an increasing trend in a ratio of power demand to the total power demand. The power demand in the business sectors has a feature of various trends in power consumption due to a variety of consumers and a feature of difficulty in its demand forecast.

In view of the difficulty in forecast of the trends in power consumption, there is "area energy management" in which a certain zone is set to comprehensively including locations of individual office buildings, commercial facilities, public facilities, and other facilities, a total value of power demand in a building group included in the zone is obtained, and an upper limit value of the power consumption in the zone is set at or below a certain level. The "area energy management" has been proposed as a method of avoiding uncertainty about the forecast of the power demand in the individual office buildings, commercial facilities, public facilities, and other facilities.

In addition, in order to cooperate with VREs, it is essential for consumers to make adjustments by, for example, suppressing an energy consumption amount and actively using surplus energy, and it is required for residents, workers in the office buildings, and employees and customers in the commercial facilities (those people are hereinafter referred to as "users"), which are the consumers, to continue to be satisfied with comfortableness defined by, for example, a temperature and a humidity. A decrease in comfortableness may adversely lower productivity in offices and affect sales of the commercial facilities.

In JP 2015-4480 A, there is disclosed a request discrimination apparatus for reliably improving an indoor environment when there is a high need for improvement of the indoor environment and avoiding transition to an extreme indoor environment due to continuation of a specific individual's reporting. This request discrimination apparatus includes: a request holding module configured to receive a request for a surrounding environment from a reporter; an environmental state quantity management module configured to calculate an environmental state quantity indicating a state of the surrounding environment of the reporter based on environmental element measurement values collected from a reporter's seated space, and to obtain a degree of dissatisfaction with the surrounding environment of the reporters from the environmental state quantity; and a discrimination processing module configured to discriminate whether the request received from the reporter is a temporary request or a regular request based on the degree of dissatisfaction.

In JP 2002-135977 A, there is disclosed a system for operating and controlling a power facility by setting a target value for an amount of power during a predetermined period. In this system, a power management apparatus configured to control the power facility and a control terminal apparatus configured to create control data based on data transferred from the power management apparatus and other data are coupled to each other in a data exchangeable manner. The power management apparatus includes power data creation means for detecting power usage of the power facility, operational data creation means for creating operational data of a facility in which the power facility is installed, and environment data creation means. The control terminal apparatus includes past data analysis means for analyzing a past operational status of the power facility based on each piece of the above-mentioned data transferred from the power management apparatus, predicted power amount calculation means for calculating a predicted amount of power based on an analysis result of the past data analysis means, and target power amount calculation means for calculating a target amount of power from the predicted amount of power. The control terminal apparatus is configured to transfer data corresponding to the target amount of power obtained by the target power amount calculation means to the power management apparatus, to thereby control the power facility.

In Jongyeon Lim, Yasunori Akashi, Doosam Song, Hyokeun Hwang, Yasuhiro Kuwahara, Shinji Yamamura, Naoki Yoshimoto, Kazuo Itahashi, "Hierarchical Bayesian modeling for predicting ordinal responses of personalized thermal sensation: Application to outdoor thermal sensation data" (Building and Environment Volume 142, September 2018, pages 414-426), as a method of estimating a correlation between a thermal sensation and satisfaction, there is disclosed a method of estimating, through the Bayesian inference, the cause of satisfaction being the thermal sensation when the outcome variable being satisfaction with the thermal sensation is known.

The power demand in the business sectors of, for example, office buildings, commercial facilities, and public facilities has the feature of various trends in power consumption due to a variety of consumers and the feature of difficulty in its demand forecast. In the related-art "area energy management" for comprehensively setting a certain zone and controlling the power demand in the building group included in the zone to have a total value equal to or smaller than a certain value, there is a fear in that energy use in each individual building may be operated in such a form as to impair the comfortableness of the residents.

Meanwhile, in order to obtain the comfortableness of users, the reports of comfortableness from the users can be used for grasping the situation, but it is still difficult to maximize the comfortableness of users in the entire living space. This is because users tend to proactively report when the users are dissatisfied but tend not to report when the situation is optimal, and hence the comfortableness cannot simply depend only on the report information.

In addition, when air conditioning for a staying space is controlled in such a manner as to maximize the comfortableness of users, energy consumption due to the air-conditioning control may increase or decrease compared to the related art. Therefore, in order to cooperate with renewable energy in terms of energy use while controlling the air conditioning of the living space so that a percentage of dissatisfied users falls within a certain range, it is essential to be able to predict a relationship between the comfortableness of users and the energy consumption.

In addition, in order to achieve such energy consumption as to utilize VREs as much as possible while maintaining the comfortableness of residents, it is essential to take specific measures not only for facility control of architectural structures for residential purposes but also for integrated control in consideration of operation modes and demand schedules.

SUMMARY

This invention has an object to distribute appropriate energy demand plans to a group of buildings in consideration of a percentage of satisfied users, and to achieve appropriate air-conditioning control based on the energy demand plan.

An aspect of the invention disclosed in this application is an energy management system, which is configured to control operations of air-conditioning facilities in a plurality of buildings, the energy management system comprising: a processor configured to execute a program; a storage device configured to store the program; and an interface communicable to/from a plurality of terminals, wherein the storage device is configured to store, for each of the plurality of buildings: a first piece of data indicating a relationship between the operation of each of the air-conditioning facilities and an energy consumption amount of each of the air-conditioning facilities; a second piece of data indicating an operational status of each of the air-conditioning facilities; a third piece of data indicating weather; and a fourth piece of data indicating warm and cold in the each of the plurality of buildings, and wherein the processor is configured to: receive, for each of the plurality of buildings, report data indicating a satisfaction feeling relating to warm and cold in a staying space of a user in the each of the plurality of buildings from each of the plurality of terminals; calculate a percentage of satisfied based on the report data for each of the plurality of buildings, the percentage of satisfied representing the satisfaction feeling as a ratio of an estimated number of users who have expressed satisfied to a number of users being a population in the staying space by a statistical method; create, for each of the plurality of buildings, a plan for operating each of the air-conditioning facilities based on the percentage of satisfied and a predetermined target percentage of satisfied; calculate a first energy consumption amount based on the first piece of data, the first energy consumption amount being obtained when each of the air-conditioning facilities in the plurality of buildings is operated by the plan distributed to the each of the plurality of buildings; calculate a second energy consumption amount based on the second piece of data, the third piece of data, and the fourth piece of data, the second energy consumption amount being obtained when the each of the air-conditioning facilities is operated after a lapse of a predetermined time period; and control, when the first energy consumption amount is larger than the second energy consumption amount, the operation of the each of the air-conditioning facilities so as to achieve the second energy consumption amount.

According to at least one representative embodiment of this invention, it is possible to achieve appropriate air-conditioning control in consideration of the percentage of the satisfied users. The details of one or more implementations of the subject matter described in the specification are set forth in the accompanying drawings and the description below. Other features, aspects, and advantages of the subject matter will become apparent from the description, the drawings, and the claims.

DETAILED DESCRIPTION OF THE EMBODIMENTS

Now, embodiments of this disclosure are described with reference to the accompanying drawings. The embodiments of this disclosure are not limited to the embodiments described later, and various modifications can be made within the gist of its technical spirit. Corresponding parts of each drawing to be used for describing each of the embodiments described later are denoted by the same reference symbols, and duplicate description is omitted.

First Embodiment

<Example of Energy Management by Energy Management System>

Figure 1:
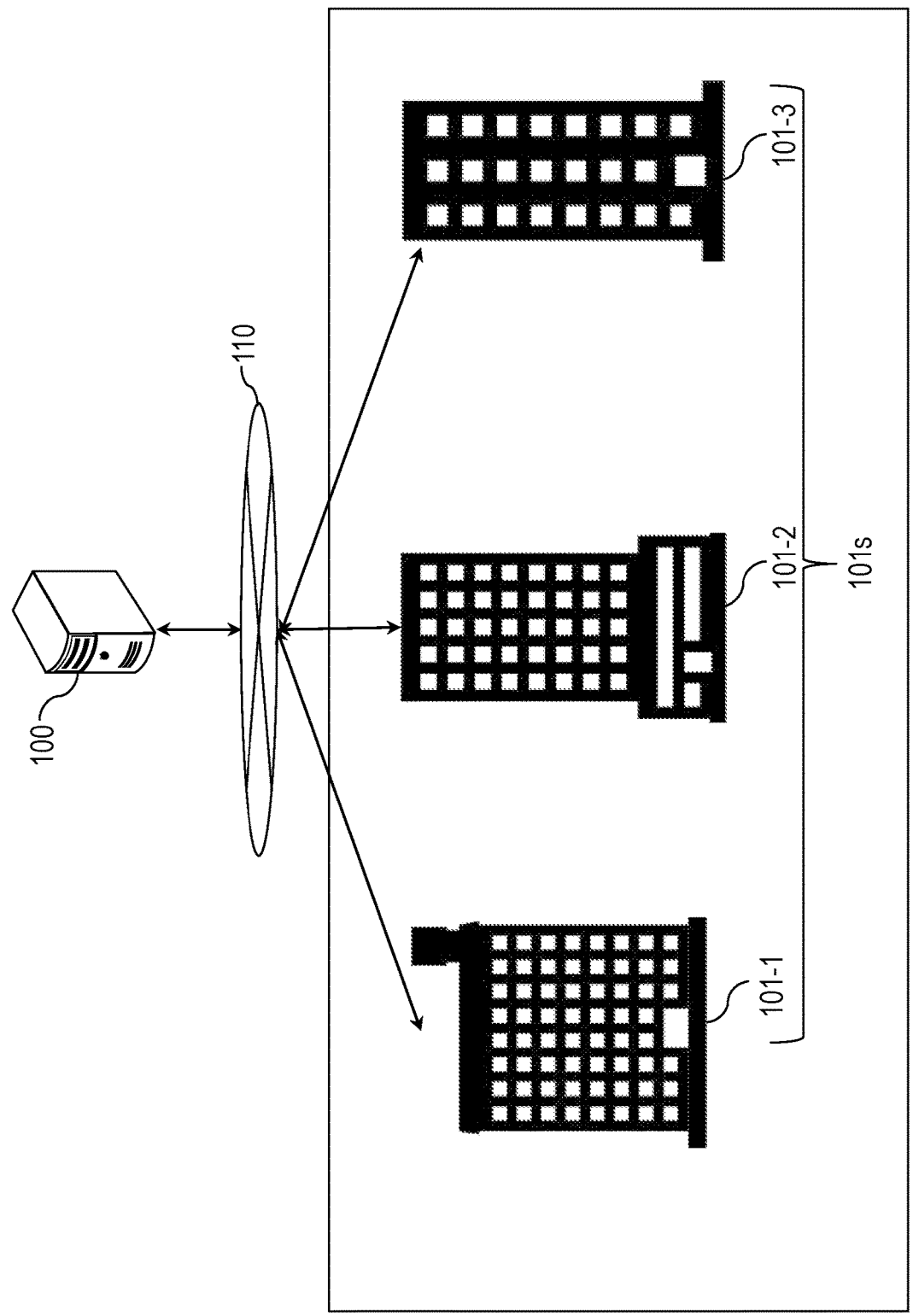
FIG. 1 is an explanatory diagram for illustrating management of a plurality of building groups among examples of energy management by an energy management system according to a first embodiment of this invention.

FIG. 1 is an explanatory diagram for illustrating management of a plurality of building groups among examples of energy management by an energy management system according to a first embodiment of this invention. An energy management system 100 is a building group 101s including a plurality of buildings 101 (Examples thereof include buildings 101-1, 101-2, and 101-3, which are referred to simply as "buildings 101" unless otherwise specified. The number of buildings 101 may be two, or equal to or larger than four.), and those buildings are coupled to one another by a power system in terms of energy. As long as the buildings 101-1, 101-2, and 101-3 are coupled to one another by the power system in terms of energy, the buildings 101-1, 101-2, and 101-3 may be physically distant from one another. The buildings 101 are, for example, office buildings, complex buildings, schools, commercial facilities, apartment buildings, and other building structures including a plurality of rooms.

Figure 2:
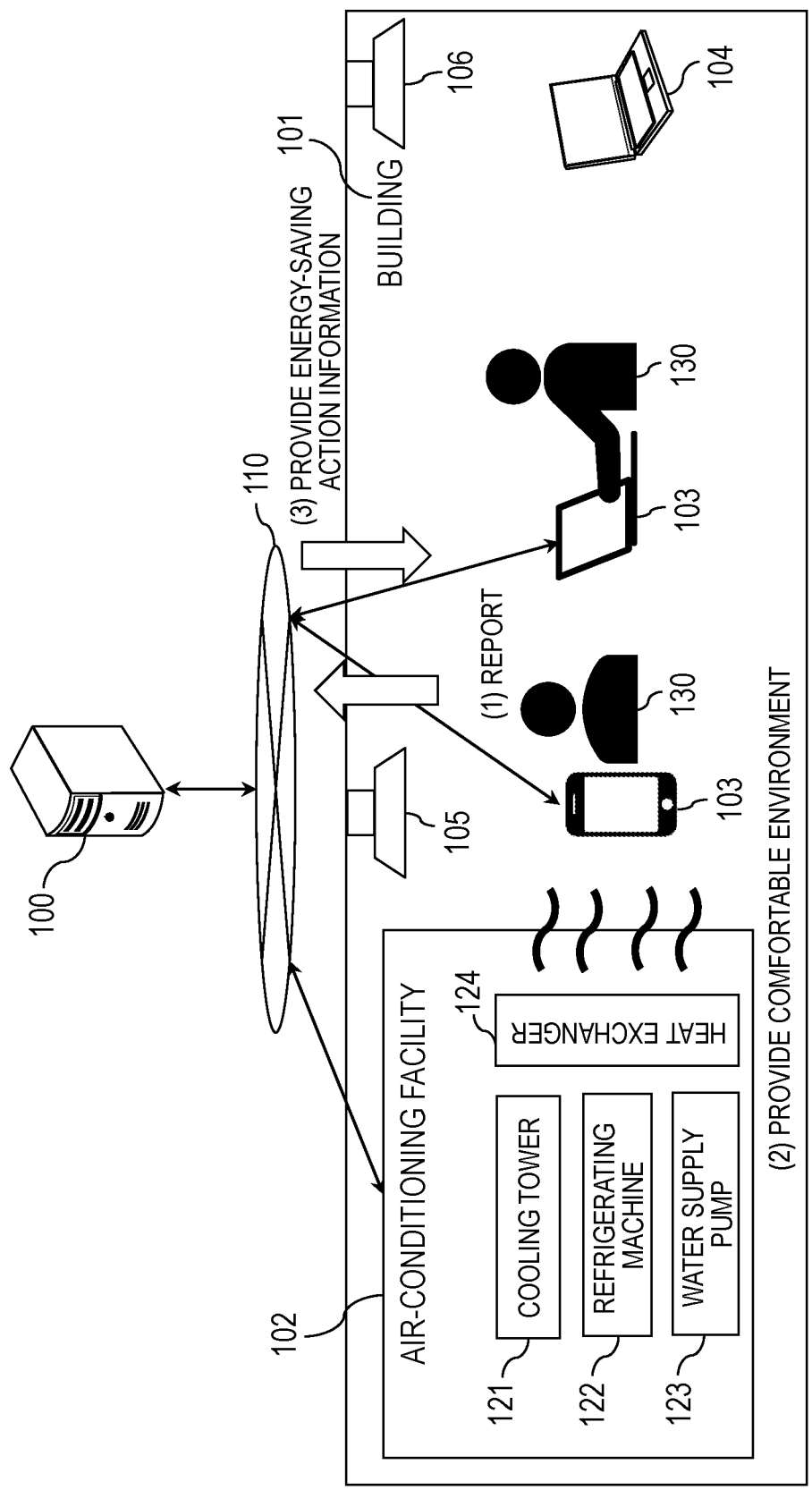
FIG. 2 is an explanatory diagram for illustrating energy management inside the building by focusing on one building in the building group illustrated in FIG. 1 among the examples of the energy management by the energy management system according to the first embodiment.

FIG. 2 is an explanatory diagram for illustrating energy management inside the building 101 by focusing on one building 101 in the building group 101s illustrated in FIG. 1 among the examples of the energy management by the energy management system 100 according to the first embodiment. The energy management system 100 is configured to control an air-conditioning facility 102 installed in the building 101 to provide a comfortable environment to users 130 in the building.

The air-conditioning facility 102 includes a cooling tower 121, a refrigerating machine 122, a water supply pump 123, and a heat exchanger 124. The cooling tower 121 is an apparatus configured to input a coolant to dissipate the coolant and to output the dissipated coolant to the refrigerating machine 122. The refrigerating machine 122 is an apparatus configured to cool the coolant from the cooling tower 121 through use of refrigerant to produce chilled water. The water supply pump 123 is configured to output the chilled water from the refrigerating machine 122 to the heat exchanger 124. The heat exchanger 124 is configured to cool the air for air conditioning with the chilled water of the refrigerating machine 122 which has been supplied by the water supply pump 123. This cooled air is blown into the building 101.

As described above, each of the users 130 is a resident or a worker in the building 101 or an employee or a customer in each of the commercial facilities. The user 130 uses a terminal 103. The terminal 103 can communicate to/from the energy management system 100 through a network 110, for example, the Internet, a local area network (LAN), or a wide area network (WAN).

In addition, an electronic apparatus 104, for example, a personal computer, a copying machine, a printer, or a refrigerator, and lighting fixtures 105 and 106 are provided in the building 101. It is assumed that the lighting fixture 105 illuminates a staying space in which the user 130 is present and the lighting fixture 106 illuminates a space in which the electronic apparatus 104 is placed.

(1) The terminal 103 transmits report data indicating a satisfaction feeling characterized by a temperature and a humidity in the staying space in the building 101 and an amount of clothes and an amount of metabolism of the user 130, to the energy management system 100 through operation input by the user 130. The energy management system 100 is also coupled to a sensor (not shown) configured to detect radiation temperatures from the user 130, the electronic apparatus 104, the lighting fixtures 105 and 106, and a floor so as to enable communication therebetween, and acquires the radiation temperatures separately from the report data. The energy management system 100 is also coupled to a sensor (not shown) configured to detect a wind velocity of the wind output from the air-conditioning facility 102 so as to enable communication therebetween, and acquires the wind velocity separately from the report data. In the following description, the term "report data" may include the radiation temperature and the wind velocity.

(2) The energy management system 100 receives the report data from the terminal 103, analyzes the satisfaction feeling of the user 130, determines an operation policy of control relating to the air-conditioning facility 102, and executes the control of the air-conditioning facility 102. (3) When a target energy reduction amount is not expected to be reached only by the control of the air-conditioning facility 102, energy-saving action information for encouraging the user 130 to take an energy-saving action is sent to the user 130 to encourage reduction of an energy consumption amount through the energy-saving action. The energy-saving action information is information for encouraging an energy-saving action of, for example, turning off the power of the electronic apparatus 104 or the lighting fixture 106 that is not being used even after the power is turned on.

<Hardware Configuration Example of Computer>

Figure 3:
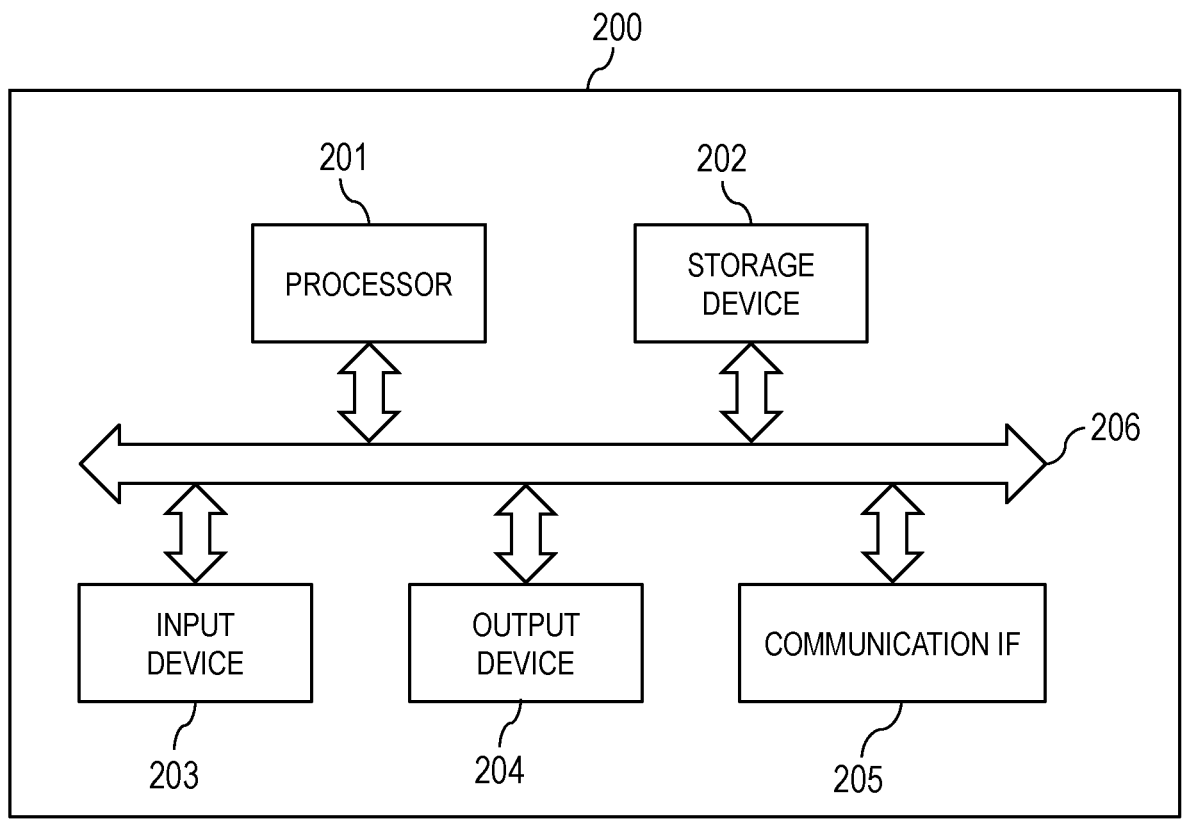
FIG. 3 is a block diagram for illustrating a hardware configuration example of each of computers (energy management system and terminal).

FIG. 3 is a block diagram for illustrating a hardware configuration example of each of computers (energy management system 100 and terminal 103). A computer 200 includes a processor 201, a storage device 202, an input device 203, an output device 204, and a communication interface (communication IF) 205. The processor 201, the storage device 202, the input device 203, the output device 204, and the communication IF 205 are coupled to one another through a bus 206. The processor 201 is configured to control the computer 200. The storage device 202 serves as a work area for the processor 201. The storage device 202 is also a non-transitory or transitory recording medium configured to store various programs and various kinds of data. Examples of the storage device 202 include a read only memory (ROM), a random access memory (RAM), a hard disk drive (HDD), and a flash memory. The input device 203 is configured to input data. Examples of the input device 203 include a keyboard, a mouse, a touch panel, a numeric keypad, and a scanner. The output device 204 is configured to output data. Examples of the output device 204 include a display, a printer, and a speaker. The communication IF 205 is coupled to the network 110, and is configured to transmit and receive data.

<Demand Distribution to Building Group>

In the building group 101s formed of a plurality of buildings 101-1, 101-2, and 101-3, in order for each individual building 101 to utilize renewable energy as much as possible to achieve decarbonization, it is required to grasp the power demand in the building 101 and distribute an appropriate power demand plan. The power demand plan is a plan relating to the power consumption of the entire building to be exhibited in conjunction with the distribution of renewable energy, and also includes an air-conditioning plan. The distribution of the power demand plan to each building 101 is determined with reference to, for example, a greenhouse gas emission amount or another index relating to the energy consumption, the performance and scale of an air-conditioning facility in each building, and an expected power demand amount in each building. For example, when the power demand plan is implemented in consideration of the performance and scale of the air-conditioning facility 102 of each building 101, the planning can be performed in consideration of the users 130 by, for example, encouraging appropriate power demand in the building 101 including the high-performance air-conditioning facility 102.

Figure 4:
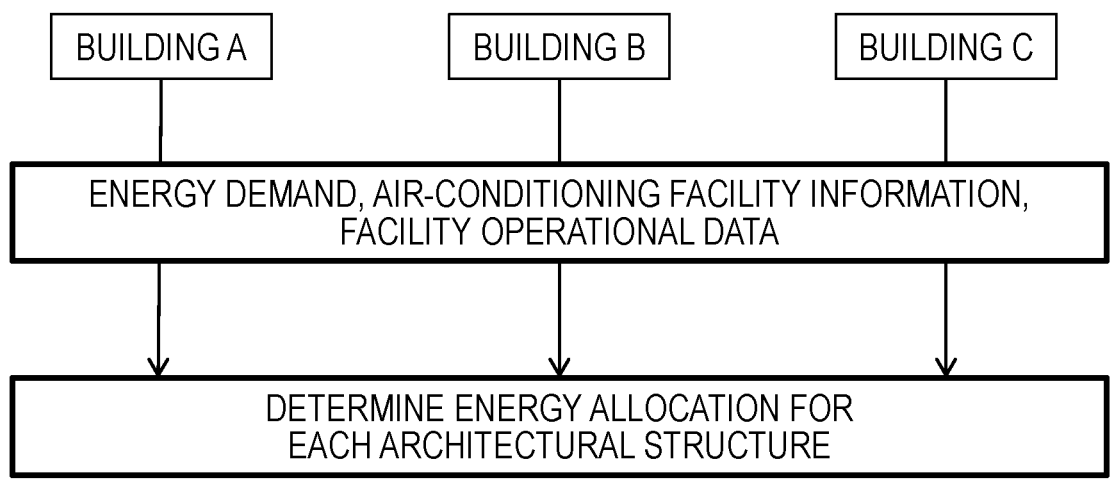
FIG. 4 is an explanatory diagram for illustrating energy demand distribution to a plurality of buildings in the first embodiment.

As illustrated in FIG. 4, a specific method of distributing the power demand plan to each building 101 is to set goals for decarbonization, power consumption costs, and other targets against the background of various factors relating to decarbonization which include a trend in power generation of renewable energy, a time trend in power wholesale unit price, a time trend in emissions per unit of power being supplied, and a time trend in power wholesale unit price of energy other than the renewable energy. For the distribution of the power demand plan to each building 101, it is possible to employ a known technology for predicting power supply and demand, for example, a technology for predicting power demand or a technology for predicting a power generation amount of renewable energy.

<Report Screen>

Figure 5:
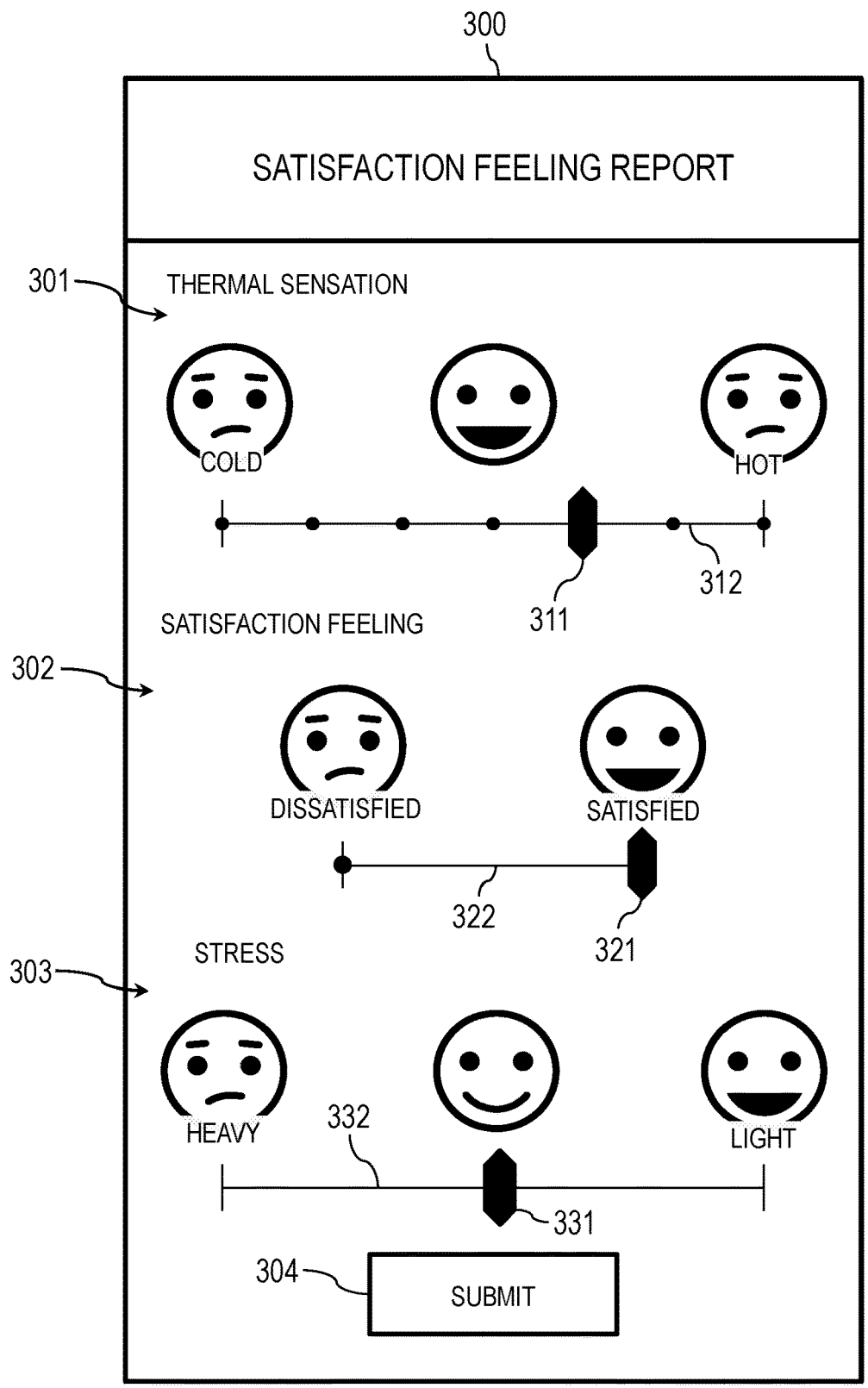
FIG. 5 is an explanatory diagram for illustrating an example of a report screen displayed on the terminal.

Next, description is given of a method of reporting, by a resident, his or her own degree of satisfaction. FIG. 5 is an explanatory diagram for illustrating an example of a report screen displayed on the terminal 103. A report screen 300 includes a thermal sensation report area 301, a satisfaction feeling report area 302, a stress report area 303, and a submit button 304. The thermal sensation report area 301 includes a first slider 311 and a first horizontal axis 312. A thermal sensation of the user 130 due to the air-conditioning facility 102 is designated by operating the first slider 311 in a direction of the first horizontal axis 312. The satisfaction feeling report area 302 includes a second slider 321 and a second horizontal axis 322. A satisfaction feeling of the user 130 with an environment air-conditioned by the air-conditioning facility 102 is designated by operating the second slider 321 in a direction of the second horizontal axis 322. The stress report area 303 includes a third slider 331 and a third horizontal axis 332. A magnitude of stress of the user 130 is designated by operating the third slider 331 in a direction of the third horizontal axis 332.

The submit button 304 is a button for transmitting, when pressed by the user 130, values of the thermal sensation, the satisfaction feeling, and the stress which have been designated through the first slider 311 to the third slider 331 as the report data from the terminal 103 to the energy management system 100.

On the report screen 300, as an example, the thermal sensation report area 301 enables one of a plurality of degrees from hot to cold to be designated through the first slider 311, but may be an area that enables the thermal sensation such as hot and cold to be designated based on the temperature, the humidity, the radiation temperature, the wind velocity, and the amount of clothes and the amount of metabolism of the resident.

The satisfaction feeling report area 302 enables the designation through the second slider 321 in the form of choosing between two options of satisfied and dissatisfied with the staying space of the user 130, but may be an area that enables the satisfaction feeling to be designated based on the temperature, the humidity, the radiation temperature, and the wind velocity in the staying space and the amount of clothes and the amount of metabolism of the resident.

The energy management system 100 may also acquire sequential data on the temperature and the humidity, which are basic data on the staying space of the user 130, from the terminal 103. The energy management system 100 is desired to acquire a plurality of points of sequential data on the temperature and the humidity so as to cover the staying space of the user 130 as much as possible.

Under the present circumstances, the radiation temperature and the wind velocity may not always be detected as sequential data due to the fact that the sensors therefor are expensive, but the energy management system 100 is desired to acquire data on the radiation temperature and the wind velocity during typical operations from the terminal 103 and refer to the data. The energy management system 100 is also desired to acquire the amount of clothes and the amount of metabolism which exert influences on the satisfaction of the user 130 from the terminal 103, but an influence on an evaluation of satisfaction is known to be small even when values of the amounts are fixed according to the related art, and hence there is no problem even when the values are fixed.

<Functional Configuration Example of Energy Management System 100>

Figure 6:
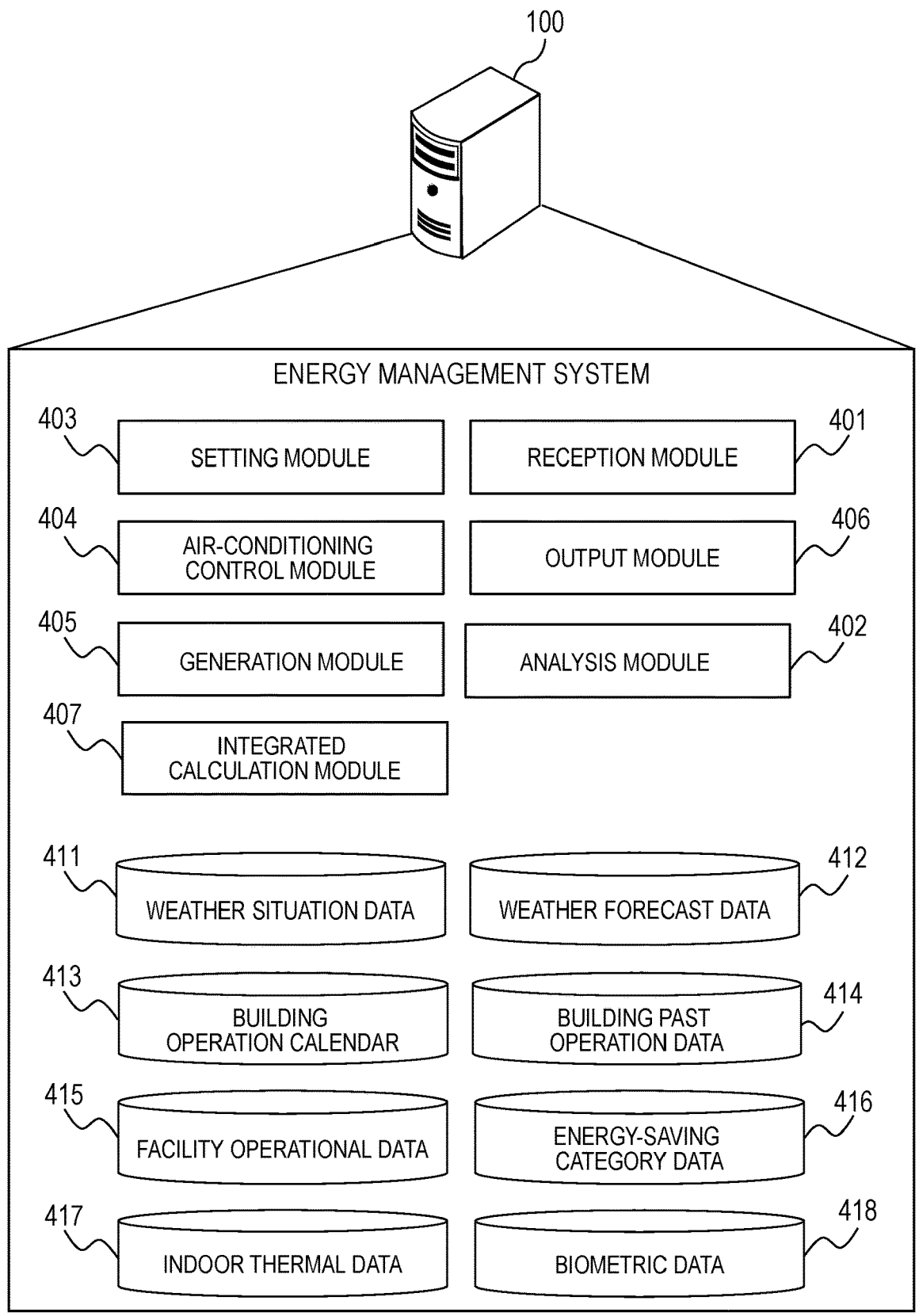
FIG. 6 is a block diagram for illustrating a functional configuration example of the energy management system.

FIG. 6 is a block diagram for illustrating a functional configuration example of the energy management system 100. In the energy management system 100, individual power demand plans are formulated for the plurality of buildings 101-1, 101-2, and 101-3, reports on the degrees of satisfaction are received from the users 130 based on the demand plans, and a target thermal sensation is calculated.

The energy management system 100 includes a reception module 401, an analysis module 402, a setting module 403, an air-conditioning control module 404, a generation module 405, an output module 406, and an integrated calculation module 407. Specifically, the reception module 401 to the integrated calculation module 407 are implemented by, for example, causing the processor 201 to execute the program stored in the storage device 202 illustrated in FIG. 2.

The reception module 401 is configured to receive the report data provided by the user 130 and various kinds of data, for example, from weather situation data 411 to biometric data 418, from the terminal 103 or the network 110 for each building 101. The analysis module 402 is configured to analyze the percentage of satisfied of the users 130 present in the staying space. The setting module 403 is configured to set conditions for air-conditioning control. Thus, a method of controlling the air-conditioning facility 102 is determined.

The air-conditioning control module 404 is configured to control an operation of the air-conditioning facility 102 based on settings of the setting module 403. The generation module 405 is configured to generate energy-saving action information for each building 101 when an energy consumption amount required for the operation of the air-conditioning facility 102 is insufficient. The output module 406 is configured to output the energy-saving action information generated by the generation module 405 to the terminal 103. The integrated calculation module 407 is configured to create an air-conditioning plan for each building 101 in accordance with a set target percentage of satisfied, and calculate an energy consumption amount A and a target energy consumption amount B of the entire plurality of buildings 101-1, 101-2, and 101-3, which are described later.

The energy management system 100 further stores the weather situation data 411, weather forecast data 412, building operation calendar 413, building past operation data 414, facility operational data 415, energy-saving category data 416, indoor thermal data 417, and the biometric data 418, in the storage device 202 for each building 101.

The weather situation data 411 includes weather data on, for example, current weather (e.g., sunny, cloudy, rain, or snow), temperature, and humidity. The weather situation data 411 is data that can be measured in the building 101 or acquired from a website of a weather forecast company (business entity licensed to provide forecasting operations).

The weather forecast data 412 is forecast data on the weather (including the temperature and the humidity) after a predetermined time period, and is data that can be acquired from the websites of the Japan Meteorological Agency and the weather forecast company.

The building operation calendar 413 includes data on details and date/time of an event to be held in the building 101.

The building past operation data 414 is actual record data obtained by recording the temperature, the radiation temperature, the humidity, and the wind velocity in the building 101 when the air-conditioning facility 102 was operated in the building 101 in the past. As the building past operation data 414, pieces of past operation data are accumulated in a log format, but the energy management system 100 may classify the building past operation data 414 to create a plurality of operation patterns. Instead of creating the operation patterns in advance, the energy management system 100 may search for similar log data to create an operation pattern each time.

The facility operational data 415 indicates an operational status of the air-conditioning facility 102 in the building 101, and includes data on, for example, a water supply temperature, a coolant temperature, operation states of valves and pumps, and the number of refrigerating machines 122 in operation.

The energy-saving category data 416 is data indicating a correspondence relationship between the energy-saving action information and the energy consumption amount reduced by the energy-saving action. The energy-saving action information is information in which energy-saving actions of, for example, turning off the lighting fixture, reducing overtime work, and proposing a break, and facilities to be subjected to the energy-saving actions (for example, the lighting fixture for the energy-saving action of turning off the lighting fixture) are associated with each other. Thus, when an energy amount for the operation of the air-conditioning facility 102 is insufficient, the generation module 405 can generate the energy-saving action information regarding the shortage by referring to the energy-saving category data 416.

The indoor thermal data 417 includes data on the indoor temperature and humidity in the building 101, and may include data relating to human sensations and behaviors (for example, thermal indices (including an effective temperature, a discomfort index, and a thermal sensation index), a sensible temperature, a thermal sensation, comfortableness, a sense of the season, and the amount of clothing).

The biometric data 418 includes, for example, a heart rate of the user 130, capillary data on a face of the user 130 photographed by a Web camera, and an observed value of a vibration sensor provided on a seat surface of a chair in which the user 130 is seated. The heart rate is transmitted from a wearable apparatus attached to the user 130 to the energy management system 100 through the terminal 103 of the user 130. The Web camera and the vibration sensor are installed in the building 101, and can transmit the capillary data and the observed value to the energy management system 100.

The individual buildings 101 differ in peak daily energy demand among office buildings, complex buildings, schools, commercial facilities, apartment buildings, and other buildings, and also differ in operation control of the air-conditioning facility 102. The buildings 101 exhibiting such different patterns of energy demand are handled as one building group 101s, and the energy consumption in this building group 101s is minimized, to thereby enable the energy management system 100 to achieve energy operation based on appropriate control corresponding to performance of the building 101 and scales of apparatus.

<Basic Operation of Energy Management System 100>

Figure 7:
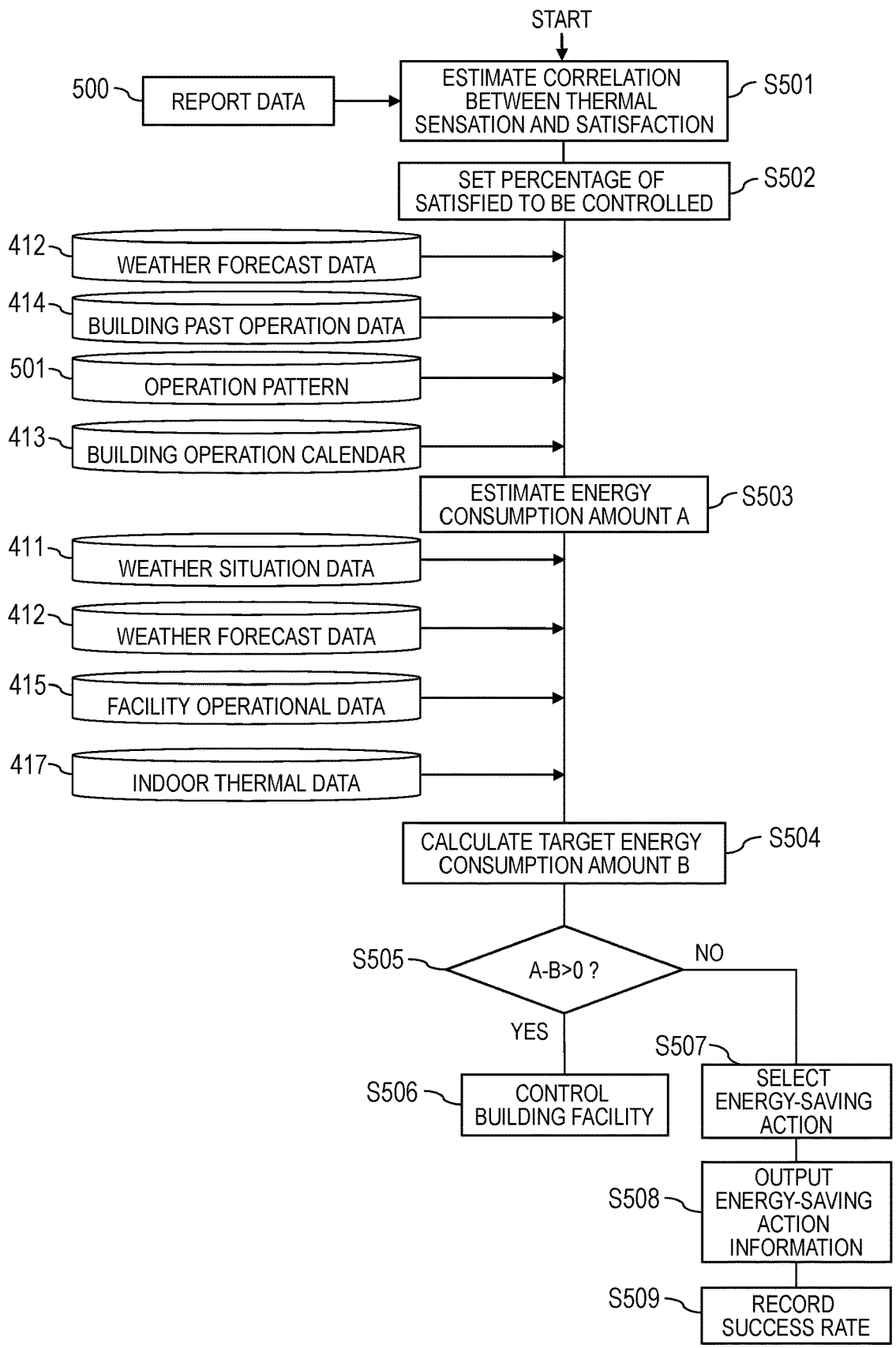
FIG. 7 is a flow chart for illustrating a basic operation example of the energy management system.

FIG. 7 is a flow chart for illustrating a basic operation example of the energy management system 100. With the air-conditioning plan, energy management is implemented based on the power demand plan distributed to each building 101. The energy management system 100 controls the reception module 401 to receive report data 500 indicating "satisfied" or "dissatisfied" and "hot" or "cold" regarding the thermal sensation in the staying space of the user 130, and controls the analysis module 402 to estimate a correlation between the thermal sensation and the satisfaction (Step S501). As a method of estimating the correlation between the thermal sensation and the satisfaction, it is appropriate to employ a method of estimating, through the Bayesian inference, the cause of the satisfaction being the thermal sensation when the outcome variable being the satisfaction with the thermal sensation is known (see, for example, "Hierarchical Bayesian modeling for predicting ordinal responses of personalized thermal sensation: Application to outdoor thermal sensation data" described above), but there is no particular limitation thereto. In this case, an example of the correlation of an operative temperature based on the report on the satisfaction is illustrated.

Figure 8:
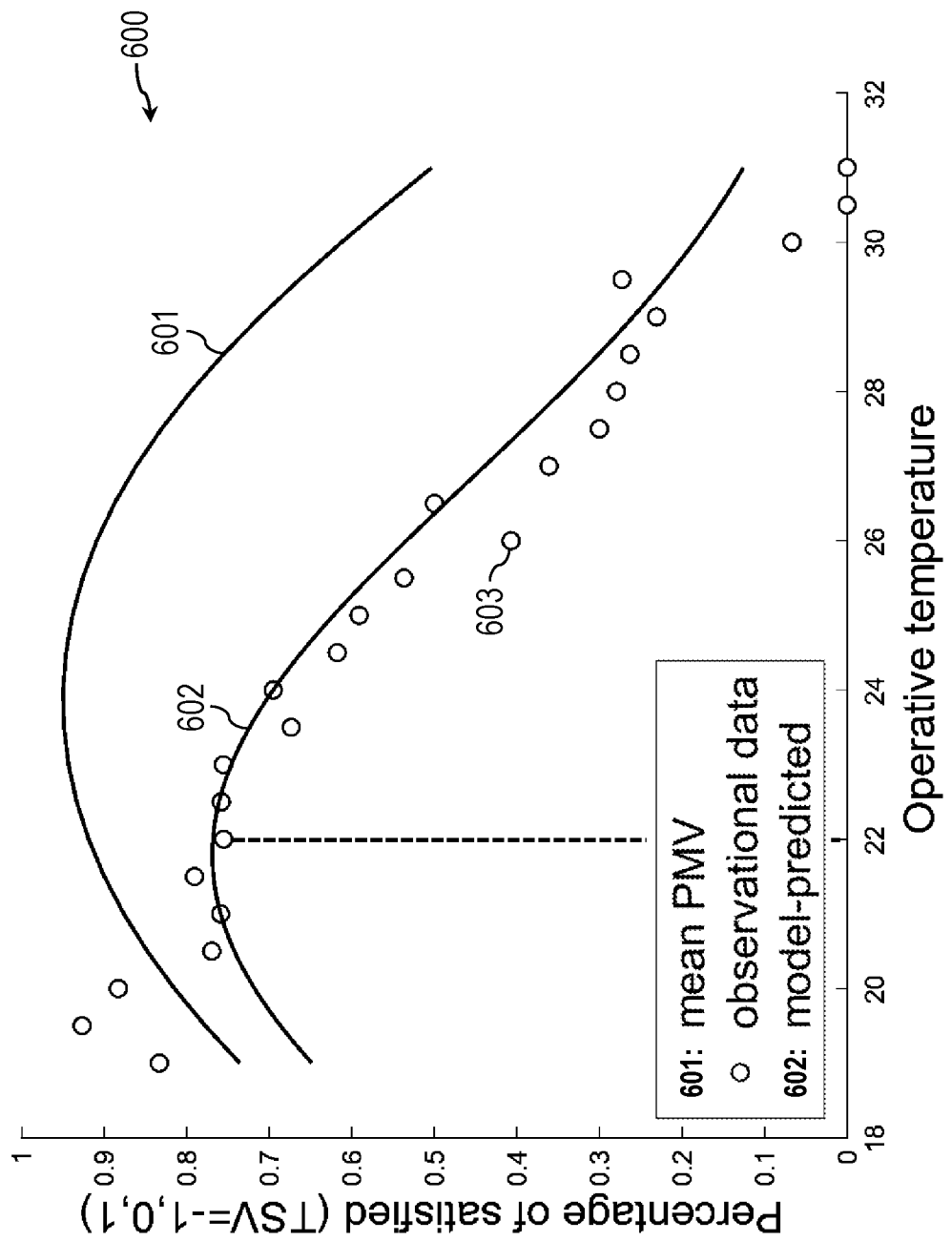
FIG. 8 is a graph for showing an example of the correlation of the operative temperature based on the report on the satisfaction.

FIG. 8 is a graph for showing an example of the correlation of the operative temperature based on the report on the satisfaction. In a graph 600, the horizontal axis represents the operative temperature, and the vertical axis represents the percentage of satisfied. The operative temperature is a temperature determined based on the indoor temperature and the radiation temperature. A first correlation data 601 indicates a related-art theoretical value. A second correlation data 602 is formed of estimated values based on observed values 603 determined by the report data 500. In general, the percentage of satisfied being a ratio of the users 130 satisfied with the thermal sensation in the staying space is about 70% at most, and it is required to reduce the number of dissatisfied users 130 as much as possible by controlling the thermal sensation with the 70% being regarded as satisfied.

In this case, a ratio of the users 130 who have reported satisfied to the total users 130 in the staying space, which are an example of a population, is defined as the percentage of satisfied.

Percentage of satisfied=(estimated number of users 130 who have reported satisfied)/(total number of users 130)　　(1)

When the case of FIG. 8 is taken as an example, the percentage of satisfied decreases as a set temperature in the staying space increases after a maximum temperature (22° C.) of the second correlation data 602. In FIG. 6, the energy management system 100 controls the setting module 403 to set the percentage of satisfied to be controlled, which is to be applied to operational control of the air-conditioning facility 102, based on the percentage of satisfied obtained by Expression (1) and the target percentage of satisfied (Step S502).

When the target percentage of satisfied has not yet been input, the energy management system 100 requests a system administrator to input the target percentage of satisfied (for example, to display the request on a display screen or transmitted to the terminal 103 of the system administrator) to encourage the input of the target percentage of satisfied. When the target percentage of satisfied has already been input, the energy management system 100 reads the target percentage of satisfied from the storage device 202.

When the percentage of satisfied is equal to or larger than the target percentage of satisfied, the energy management system 100 determines the target percentage of satisfied as the percentage of satisfied to be controlled. When the percentage of satisfied is not equal to or larger than the target percentage of satisfied, the energy management system 100 determines the percentage of satisfied as the percentage of satisfied to be controlled in a case in which a difference between the percentage of satisfied and the target percentage of satisfied falls within an allowable range, and forcibly determines the target percentage of satisfied as the percentage of satisfied to be controlled in a case in which the difference falls out of the allowable range.

When the percentage of satisfied to be controlled is set, the energy management system 100 refers to FIG. 6 to determine an operative temperature to be controlled in the building 101 corresponding to the percentage of satisfied to be controlled. The energy management system 100 back-calculates a temperature to be controlled and a radiation temperature to be controlled from the operative temperature to be controlled. The energy management system 100 further determines a humidity to be controlled by giving the temperature to be controlled, the radiation temperature to be controlled, and a wind velocity to be controlled (fixed value) to a freely-set thermal sensation index, for example, a predicted mean vote (PMV). Then, the energy management system 100 identifies, from a plurality of operation patterns 501, a specific operation pattern 501 including the temperature to be controlled, the radiation temperature to be controlled, the humidity to be controlled, and the wind velocity to be controlled.

Then, the energy management system 100 controls the air-conditioning control module 404 to create the air-conditioning plan with reference to the weather forecast data 412, the building past operation data 414, the operation pattern 501, and the building operation calendar 413, which are external factors.

The air-conditioning plan can be calculated based on simulations of the temperature to be controlled, the radiation temperature to be controlled, the humidity to be controlled, and the wind velocity to be controlled, which are parameters obtained by setting the percentage of satisfied to be controlled, but the calculation is not realistic due to its large calculation amount. Therefore, the energy management system 100 creates the air-conditioning plan by selecting the operation pattern 501. Subsequently, the energy management system 100 estimates the energy consumption amount A of the air-conditioning facility 102 when the air-conditioning facility 102 is operated based on the selected operation pattern (Step S503).

Figure 9:
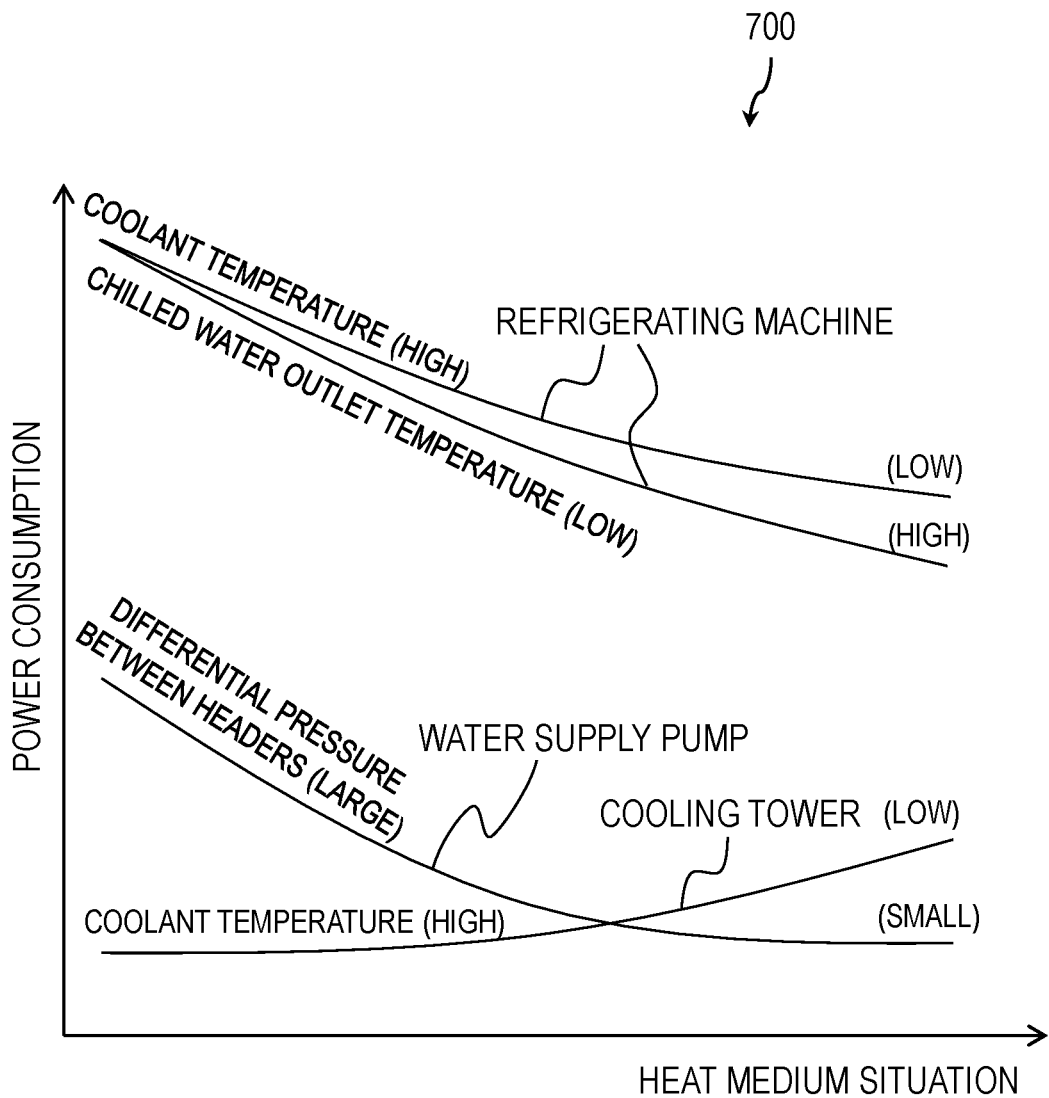
FIG. 9 shows a specific energy consumption amount (power consumption) with respect to a target load for each of the cooling tower, the refrigerating machine, and the water supply pump of the air-conditioning facility.

FIG. 9 is a graph for showing a relationship between the operation of the air-conditioning facility 102 and the power consumption. A graph 700 is a graph created based on the building past operation data 414 and the building operation calendar 413. The curves of the graph 700 varies depending on the weather forecast data 412. The energy management system 100 controls the power consumption being an example of the energy consumption amount based on a balance among the operations of the refrigerating machine 122 (control of the water supply temperature), the water supply pump 123 (control of a differential pressure between headers and a water supply amount), the cooling tower 121 (control of the coolant temperature), which are included in the air-conditioning facility 102.

FIG. 9 shows a specific energy consumption amount (power consumption) with respect to a target load for each of the cooling tower 121, the refrigerating machine 122, and the water supply pump 123 of the air-conditioning facility 102. A total of those energy consumption amounts is the energy consumption amount A of the air-conditioning facility 102 to be estimated. Therefore, the energy management system 100 controls the operating number and output of the refrigerating machine 122, the pressure of the water supply pump 123 for supplying chilled water, and the air flow for air-conditioning the room in Step S506, which is described later, so as to optimize the cooling tower 121, the refrigerating machine 122, and the water supply pump 123 for the target loads. Thus, instead of detailed control conditions, it is possible to achieve the shortening of both time periods for determining the percentage of satisfied of the users 130 and a control policy.

In this manner, the energy consumption amount A is estimated by the integrated calculation module 407 based on the report data 500. The energy consumption amount A is estimated with the satisfaction of the user 130 being maintained at a constant level, and hence the energy consumption amount generally becomes smaller than a related-art energy consumption amount based on a uniform temperature setting, for example, a room temperature setting of 28° C. in summer.

The energy management system 100 controls the integrated calculation module 407 to determine whether or not "A−B>0" is satisfied (that is, whether or not A is larger than B). The symbol B represents a target energy consumption amount. The energy management system 100 controls the integrated calculation module 407 to calculate the target energy consumption amount B after a predetermined time period (for example, after 30 minutes) based on the weather situation data 411, the weather forecast data 412, the facility operational data 415, and the indoor thermal data 417 (Step S504). Step S504 is executed when, for example, the energy management system 100 receives a demand response from a consumer using the building 101. The target energy consumption amount B may be an energy consumption amount set in advance.

Subsequently, when "A−B>0" is satisfied (Yes in Step S505), the energy management system 100 controls the operating number and output of the refrigerating machine 122, the pump pressure for supplying chilled water, and the air flow for air-conditioning the room so as to achieve the target energy consumption amount B (Step S506).

Meanwhile, when "A−B>0" is not satisfied (No in Step S505), the energy consumption amount of the air-conditioning facility 102 is insufficient only with the energy reduction amount by the operational control of the air-conditioning facility 102. Therefore, in order to make up for the shortage, the energy management system 100 controls the generation module 405 to select an energy-saving action corresponding to the shortage from the energy-saving category data 416 (Step S507).

Then, the energy management system 100 controls the output module 406 to transmit the selected energy-saving action information to the terminal 103 (Step S508). Thus, when there is a shortage, replenishment corresponding to the energy reduction amount can be performed by the energy-saving action instructed for the user 130.

In regard to the energy-saving action, it is known from the field of behavioral psychology that it is effective to give a plurality of options. In the first embodiment as well, it is desired that the energy management system 100 transmit a plurality of pieces of energy-saving action information through use of the terminal 103, for example, a smartphone or a personal computer for work. Specifically, it is clear that there is an energy-saving action that is easily allowed depending on a transmission time slot, the weather, and the target percentage of satisfied, and in the first embodiment as well, the energy management system 100 may control the generation module 405 to select the energy-saving action information with reference to the transmission time slot, the weather, and the target percentage of satisfied.

For example, when the transmission time slot is a working time slot (which may vary depending on the weather), the generation module 405 may select an energy-saving action of, for example, temporarily refraining from using a heat source in a common area including a hot water supply area. Meanwhile, when the transmission time slot is outside working hours (which may vary depending on the weather), the generation module 405 may select an energy-saving action relating to turning off, for example, an energy-saving action of turning off the lighting fixtures in the office or turning off the lighting fixtures in the common area, or may select an energy-saving action relating to lowering of concentration, for example, an energy-saving action of suppressing overtime work or lowering work efficiency. This can suppress the energy consumption amount by encouraging the users to return home or take a break. When a plurality of target percentages of satisfied are set, the generation module 405 may select energy-saving action information for each of the plurality of target percentages of satisfied.

Further, the energy management system 100 controls the generation module 405 to set, as a success rate, a ratio of the users 130 who have returned a response corresponding to the energy-saving action to the energy management system 100 out of the number of terminals 103 to which the energy-saving action information has been transmitted, and to record the success rate together with the energy-saving action information (Step S509). The generation module 405 sorts pieces of energy-saving category data 416 in descending order of the success rate, to thereby evaluate the energy-saving category data 416, namely, the energy-saving action. When a plurality of energy-saving actions can be selected, the energy management system 100 may control the generation module 405 to select, from among the plurality of energy-saving actions, the energy-saving action having a high success rate or an energy-saving action having a success rate equal to or higher than a threshold value. Thus, the energy-saving action is selected with great importance placed on actual records. In this manner, the pieces of energy-saving category data 416 are classified into categories that are highly relating to the transmission time slot of the energy-saving action information, the weather, and the target percentage of satisfied.

As described above, in order to achieve both the minimized emission of greenhouse gases and the satisfaction of each individual user, the energy management system 100 can formulate the air-conditioning plan based on the report data 500 so as to ensure the percentage of satisfied equal to or higher than a certain level, the percentage indicating the ratio of users who are satisfied in the entire staying space, and can send the energy-saving action information to the users when the energy consumption amount is insufficient.

<Estimation of Opinions of Entire Users 130 with Respect to Report Data 500>

The user 130 frequently transmits the report data 500 to the energy management system 100 when he or she feels dissatisfied, but often avoids transmitting the report data 500 when he or she feels satisfied. Therefore, it is often unclear whether or not the percentage of satisfied of the entire users 130 is grasped simply by accumulating pieces of the report data 500. In view of this, the energy management system 100 extracts a plurality of a certain number of user groups at different times, calculates the percentage of satisfied for each of the user groups by Expression (1), and compares the percentages with one another, to thereby be able to estimate an appropriate percentage of satisfied.

Figure 10:
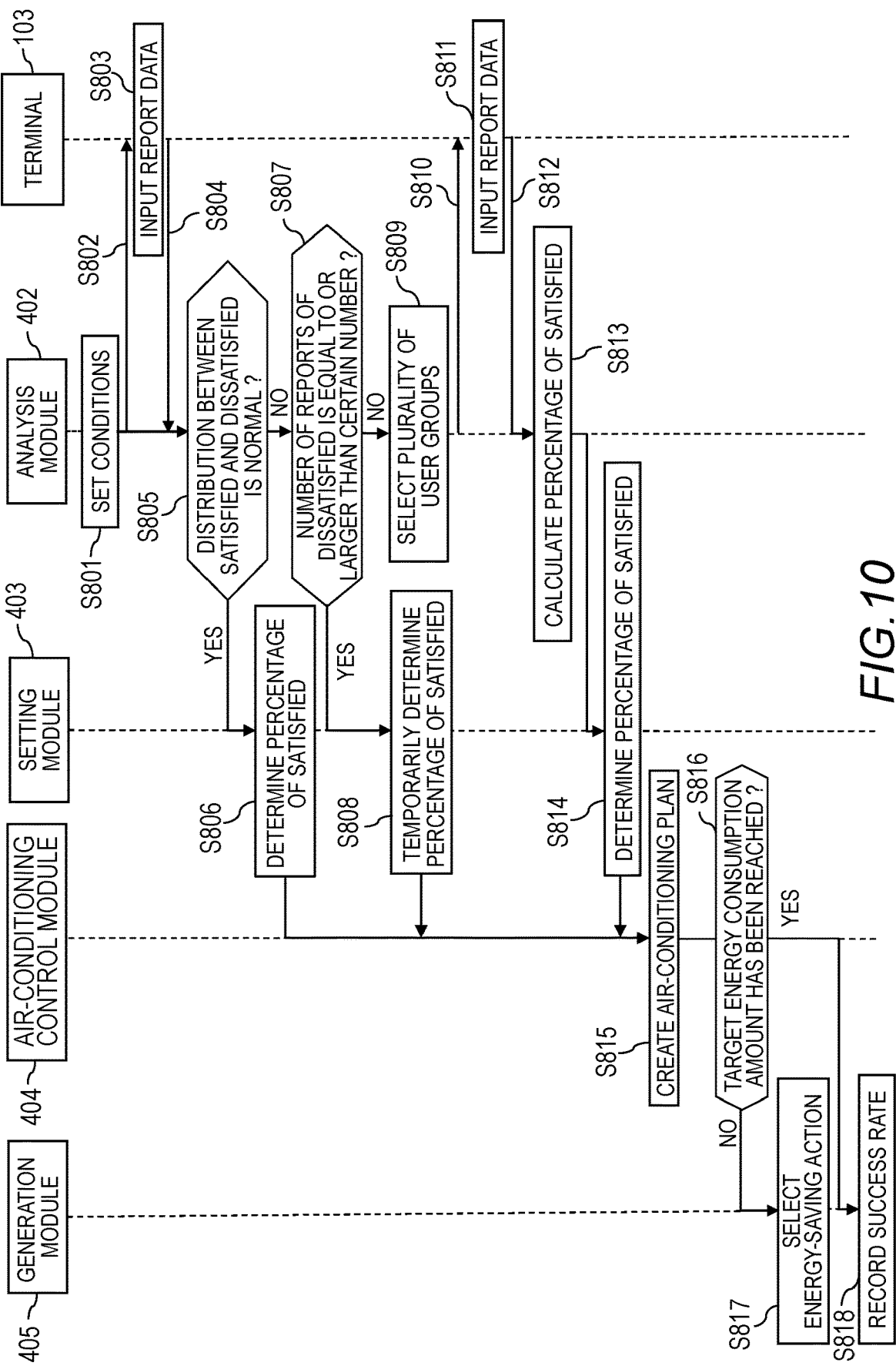
FIG. 10 is an explanatory flow chart for illustrating estimation of opinions of the entire users with respect to the report data.

FIG. 10 is an explanatory flow chart for illustrating estimation of opinions of the entire users 130 with respect to the report data 500. The vertical dotted line indicates a time axis, and it is assumed that the time passes in a direction from top to bottom. The analysis module 402 sets a certain number of target users 130 and a time and cycle period for the certain number of users 130 to transmit the report data 500 (Step S801). The setting may be performed in Step S801 by a system administrator through his or her input or by the analysis module 402 through selection from past setting examples. It is also desired that the number of users to be encouraged to transmit the report data 500 be limited to a part of the entire users 130, for example, about 10% so as to avoid an imbalance in the users 130. In addition, it is desired to balance the time to encourage the user to transmit the report data 500 among morning, afternoon, and evening so as to avoid the imbalance.

The analysis module 402 transmits a request for the report data 500 to the terminal 103 (Step S802). Thus, the report screen 300 is displayed on a display of the terminal 103. The user 130 inputs, on the report screen 300, the report data 500 on, for example, the thermal sensation, the satisfaction feeling, and the stress (Step S803), and transmits the report data 500 to the energy management system 100 (Step S804).

After extracting a certain number of users 130 in this manner, the analysis module 402 executes an analysis of the percentage of satisfied based on the report data 500, but at this time, determines regarding pieces of report data 500 accumulated so far whether or not the number of pieces of report data 500 indicating dissatisfied is extremely large and whether or not a distribution between satisfied and dissatisfied is normal (Step S805). The wording "extremely large" refers to, for example, equal to or larger than a predetermined threshold value being larger than half of the total.

When the dissatisfied is not extremely large, the analysis module 402 determines that the distribution between satisfied and dissatisfied is normal (Yes in Step S805), and the setting module 403 determines the percentage of satisfied calculated with the normal distribution as the percentage of satisfied to be compared with the target percentage of satisfied (Step S806).

Meanwhile, when the report data 500 indicating dissatisfied is extremely large, that is, equal to or larger than the predetermined threshold value larger than half of the total, there is a certain imbalance with a bias toward dissatisfied, and hence the analysis module 402 determines that the distribution is not normal (No in Step S805). For example, it is determined that the distribution is normal when a ratio between numbers of pieces of report data 500 indicating satisfied and dissatisfied is from 7:3 to 3:7 (Yes in Step S805), and otherwise it is determined that the distribution is abnormal (No in Step S805).

Subsequently, the analysis module 402 determines whether or not the number of pieces of report data 500 indicating dissatisfied is equal to or larger than a certain number (Step S807). When the number is equal to or larger than the certain number (Yes in Step S807), even in the case of "No" in Step S805, the setting module 403 temporarily determines the percentage of satisfied calculated by the analysis module 402 as the percentage of satisfied to be compared with the target percentage of satisfied (Step S808).

When Step S807 results in "No", there are a case in which specific users 130 each have transmitted a large number of reports indicating dissatisfied and a case in which there are actually a large number of dissatisfied users 130. Therefore, the analysis module 402 selects a plurality of user groups at different times (Step S809), and transmits a request for the report data 500 to the terminal 103 of each user 130 of each user group (Step S810). Thus, the report screen 300 is displayed on the display of the terminal 103. The user 130 inputs, on the report screen 300, the report data 500 on, for example, the thermal sensation, the satisfaction feeling, and the stress (Step S811), and transmits the report data 500 to the energy management system 100 (Step S812).

The analysis module 402 calculates the percentage of satisfied for each user group (Step S813). A user group of specific users 130 each having transmitted a large number of reports indicating dissatisfied exhibits a smaller value of the denominator of Expression (1) than that of a user group actually including a large number of dissatisfied users 130. Therefore, the user group of specific dissatisfied users 130 from which a large number of pieces of report data 500 have been received and the user group actually including a large number of dissatisfied users are distinguished from each other to exclude the percentage of satisfied of the former user group and output the percentage of satisfied of the latter user group to the setting module 403. When there are a plurality of user groups distinguished as the latter user group, the analysis module 402 may output any one of the percentages of satisfied or output a maximum value, a minimum value, an average value, a median value, or another statistical value of the percentage of satisfied. The setting module 403 determines the percentage of satisfied calculated by the analysis module 402 as the percentage of satisfied to be compared with the target percentage of satisfied (Step S808).

The air-conditioning control module 404 creates the air-conditioning plan through the percentage of satisfied determined or temporarily determined in Step S806, Step S808, or Step S814 (Step S815). Specifically, for example, as indicated in Step S503, the energy management system 100 selects the operation pattern and estimates the energy consumption amount A. The air-conditioning control module 404 determines whether the target energy consumption amount A has been reached (Step S816). If the target energy consumption amount A has been reached (Step S816: Yes), the generation module 405 executes Step S818. If the target energy consumption amount A has not been reached (Step S816: No), the generation module 405 executes Step S817.

After that, the generation module 405 selects the energy-saving action as indicated by Step S507 (Step S817), and records the success rate as indicated by Step S509 (Step S818).

As described above, according to the first embodiment, when the target value of the air-conditioning plan is not satisfied only by the operation control of the air-conditioning facility 102, it is possible to make up for the shortage of the energy consumption amount by encouraging the users 130 to take the energy-saving action in the staying space. In addition, it is possible to calculate the percentage of satisfied of the entire users 130 with high accuracy by suppressing the imbalance in the number of pieces of report data 500 indicating dissatisfied, to thereby be able to appropriately control the air-conditioning facility 102 based on the percentage of satisfied of the users 130.

Second Embodiment

<Integrated Control of Percentage of Satisfied of Users, Power Demand Adjustment of Building, and Decarbonization>

When the air-conditioning facility 102 is controlled while maintaining the percentage of satisfied of the users in the first embodiment, it is required to simultaneously achieve reduction of the greenhouse gas emission amount, reduction of the energy consumption, and reduction of other environmental loads in the building 101. When the control of the air-conditioning facility performed while maintaining the percentage of satisfied of the users is based solely on requests received from the users, the power demand may rather increase in, for example, high-temperature and high-humidity summer and a severely cold season.

In a second embodiment of this invention, in view of such a problem, with the percentage of satisfied of the users, the energy consumption amount, the number of users, and the greenhouse gas emission amount being used as parameters, those parameters are formulated in the form of a product thereof, and a target value is set for each individual term. Thus, the energy management system 100 enables proper control of each of the percentage of satisfied of the users, the emission of greenhouse gases, and the energy consumption. In the second embodiment, points different from those of the first embodiment are mainly described, and hence the same parts as those of the first embodiment are omitted through use of the same reference symbols.

A specific example of formulating parameters in the form of a product thereof with a target percentage of satisfied 506 of the users, a target energy consumption amount 507, the number of users, and a greenhouse gas emission amount 505 being used as the parameters is expressed by Expression (2).

$$[(\text{Greenhouse gas emission amount})/(\text{percentage of satisfied of users})]=[(\text{greenhouse gas emission amount})/(\text{energy consumption amount})]\times[(\text{energy consumption amount})/(\text{number of users})]\times[1/(\text{total sum of percentages of satisfied/number of users})] \quad (2)$$

In this case, [(greenhouse gas emission amount)/(percentage of satisfied of users)] on the left-hand side is a target value for maximizing the percentage of satisfied of the users of the building and minimizing the greenhouse gases, and is desired to have as small a value as possible. Hitherto, it has been general that the left-hand side is [(greenhouse gas emission amount)/(number of users)], but in this case, when the greenhouse gas emission amount is simply wished to be reduced, there is also established a solution that it suffices to sacrifice the percentage of satisfied, that is, to put up with the heat of summer and the cold of winter even temporarily. Therefore, in order to maintain the percentage of satisfied of the users, a numerical value target is set for each term on the right-hand side.

The terms on the right-hand side are expressed in the form of a product, to thereby be able to achieve overall optimization rather than individual optimization due to combined effects exerted by the terms. The representation of the product form expressed by Expression (2) is merely an example, and is not limited to this representation.

The first term [(greenhouse gas emission amount)/(energy consumption amount)] on the right-hand side is a term that can control the encouragement to use renewable energies, and is desired to have as small a numerical value as possible. In order to reduce the numerical value of the first term, there is also established a solution of reducing only the energy consumption amount, that is, sacrificing the percentage of satisfied of the users, and hence it is required to consider the reduction of the greenhouse gas emission amount, that is, the encouragement to use renewable energies.

The second term [(energy consumption amount)/(number of users)] on the right-hand side corresponds to an energy consumption amount per user, and is desired to have as small a numerical value as possible. This energy consumption amount is defined in conjunction with the first term, but is a numerical value per user. Therefore, it is desired to reflect architectural facilities and an operation status of each building 101, and the proper energy consumption of each building 101 is indexed by the second term.

The third term [1/(total sum of percentages of satisfied/number of users)] on the right-hand side is the reciprocal of a percentage of satisfied per user, and is desired to have as small a numerical value as possible. The third term is optimized by the energy management system 100, but is set in conjunction with the first term and the second term which are included in Expression (2). Therefore, it is possible to achieve the reduction of the greenhouse gas emission amount and the reduction of the energy consumption while satisfying the percentage of satisfied.

As an example, when the effects are estimated through use of the actual data on the building based on the first embodiment, the numerical value of [(greenhouse gas emission amount)/(percentage of satisfied of users)] can be improved by 20% to 30% compared to a case in which the energy management system 100 according to the first embodiment is not implemented, and the greenhouse gas emission amount relating to the first term on the right-hand side can be reduced by 5% to 10% on average. In addition, a loss of the energy consumption amount can be reduced by 10% to 15% on average by the demand plan and appropriate control found in the energy management system 100 according to the first embodiment.

Figure 11:
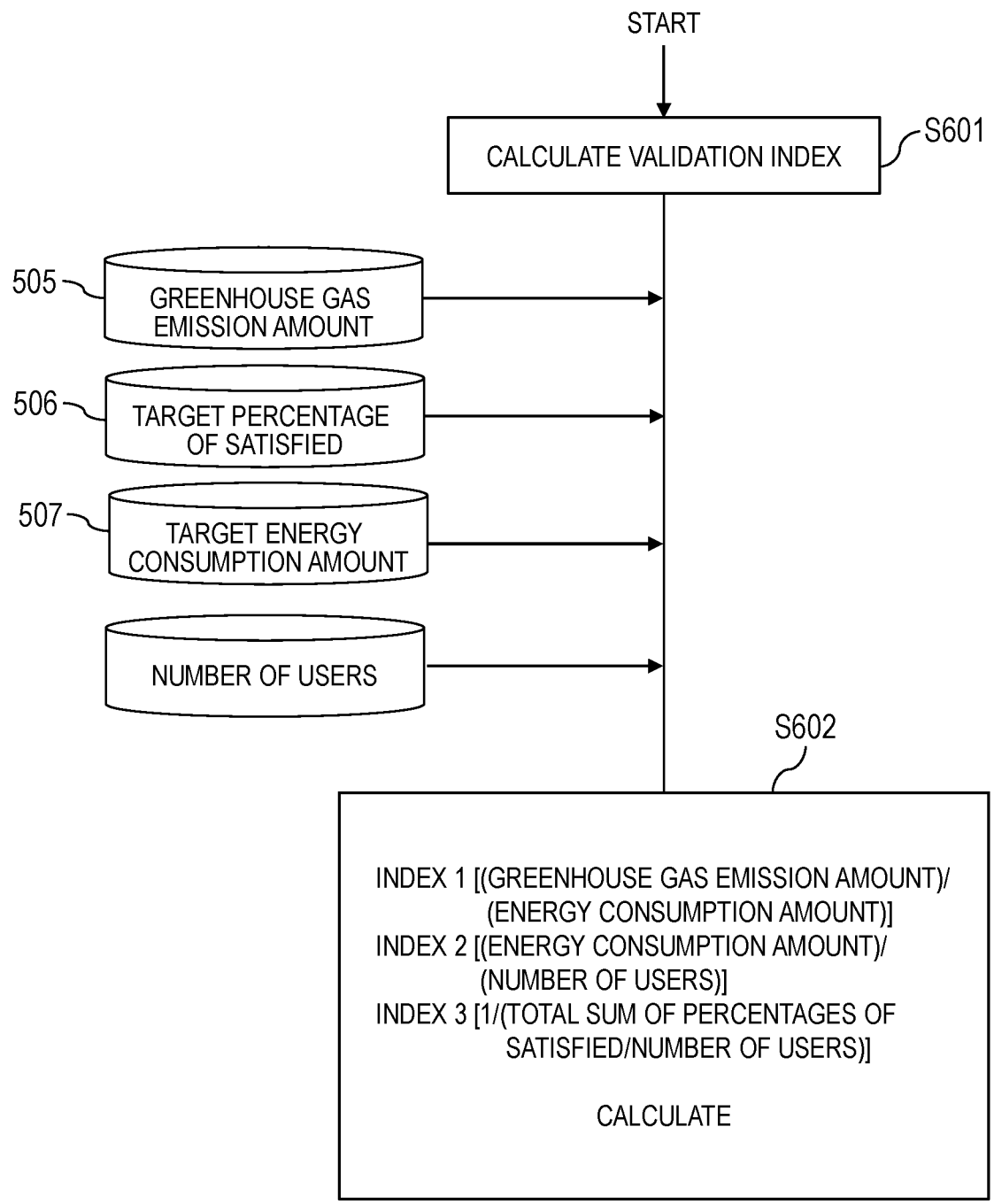
FIG. 11 is a flow chart for illustrating an example of integrated control of the percentage of satisfied of the users, a power demand adjustment of the building, and the decarbonization, which is to be performed by the energy management system according to the second embodiment.

FIG. 11 is a flow chart for illustrating an example of integrated control of the percentage of satisfied of the users, a power demand adjustment of the building, and the decarbonization, which is to be performed by the energy management system 100 according to the second embodiment. The energy management system 100 calculates [(greenhouse gas emission amount)/(percentage of satisfied of users)] on the left-hand side of Expression (2) as a validation index (Step S601). Subsequently, the energy management system 100 calculates each term on the right-hand side of Expression (2) as an index (Step S602).

When a calculation result on the right-hand side of Expression (2) is equal to or smaller than the validation index on the left-hand side, the energy management system 100 is determined to be properly operating the building group 101s. The indices of the terms on the right-hand side of Expression (2) have complicated relevance in terms of, for example, the percentage of satisfied and the use amount of renewable energies to be used as the reference of the greenhouse gas emission amount. Therefore, when the calculation result on the right-hand side of Expression (2) is not equal to or smaller than the validation index on the left-hand side, the energy management system 100 notifies a facility administrator or the like of each index. Thus, the facility administrator or the like can also reflect the result of the indices to manually correct the target percentage of satisfied, the energy consumption amount A, and the target energy consumption amount B which are required by the energy management system 100.

In this manner, it is possible to achieve the reduction of the greenhouse gas emission amount and the reduction of the energy consumption in a consumer business sector by maintaining the percentage of satisfied of the users of the building.

Third Embodiment

Now, description is given of a third embodiment of this invention. In the first embodiment, the energy management system 100 executes the control of the air-conditioning facility 102 and the transmission of the energy-saving action information based on the report data 500. The report data 500 is characterized by the thermal sensation, namely, the temperature, the humidity, the radiation temperature, the wind velocity, the amount of clothes, and the amount of metabolism. However, in the third embodiment, the report data 500 is associated with the individual's biometric data 418 including a degree of concentration and stress during work. In the third embodiment, points different from those of the first embodiment are mainly described, and hence the same components as those of the first embodiment are denoted by the same reference symbols, and description thereof is omitted.

Figure 12:
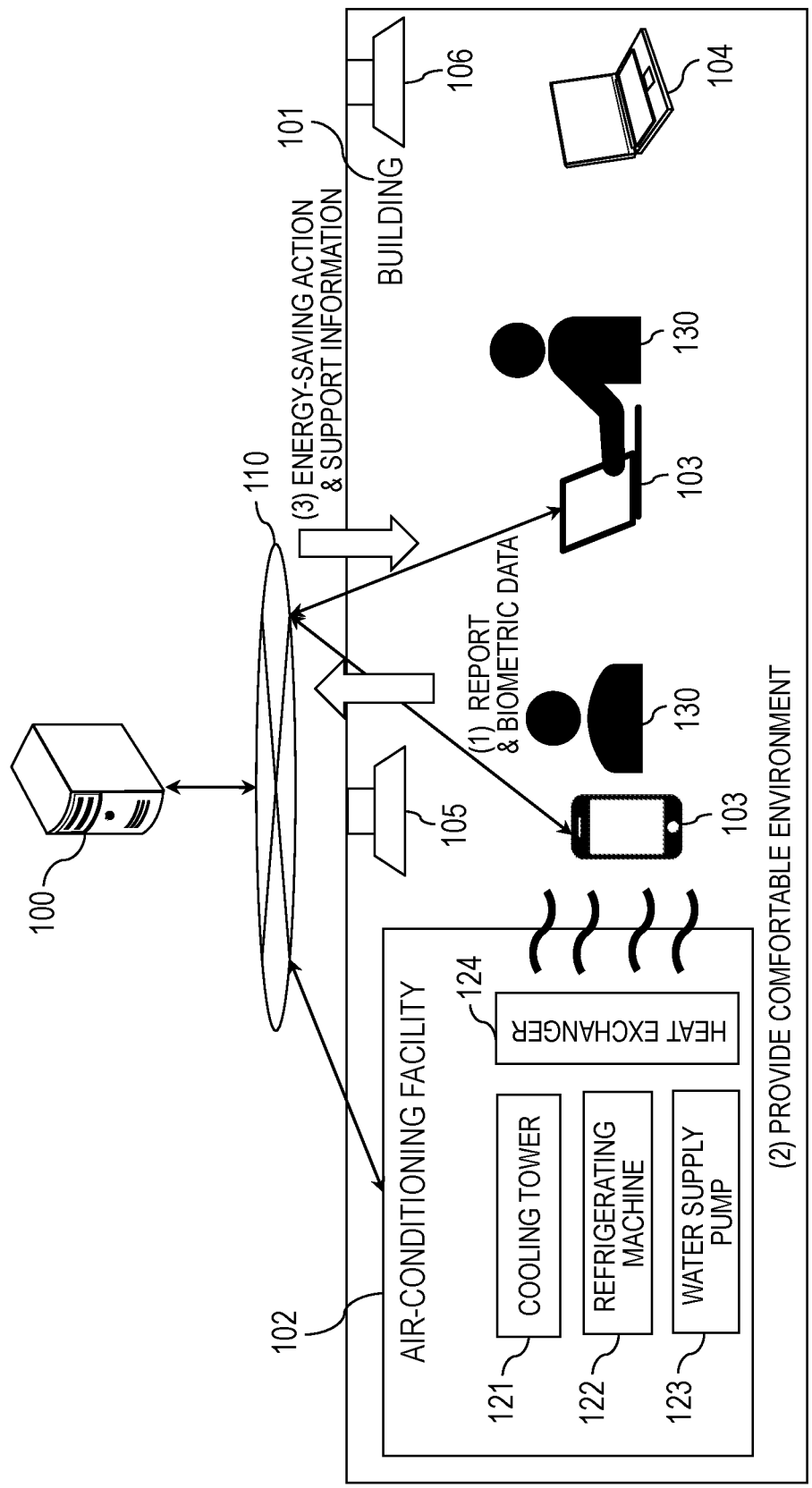
FIG. 12 is an explanatory diagram for illustrating an example of the energy management by the energy management system according to the third embodiment.

FIG. 12 is an explanatory diagram for illustrating an example of the energy management by the energy management system 100 according to the third embodiment. In Step (1), the biometric data 418 is also transmitted to the energy management system 100 together with the report data 500. In Step (3), not only the energy-saving action information but also support information relating to the usage of the building 101 is transmitted to the terminal 103.

The support information is information for supporting the work in the building 101, which includes the degree of concentration and stress of each individual user 130. In addition to the thermal sensation, biometric information including the degree of concentration, stress, and fatigue of each individual user 130 is also indirectly reflected in the report data 500 on the satisfaction feeling based on the thermal sensation. Therefore, in the second embodiment, the biometric data 418 on each individual user 130 is added to grasp the degree of concentration, stress, and fatigue of each individual user 130, and is transmitted to the terminal 103 as the support information.

There are no particular restrictions imposed on the biometric data 418, but it is desired to acquire the biometric data 418 by a method having little effect on the work. For example, it is possible to grasp the degree of concentration of each individual user 130 by continuously monitoring an intensity ratio of a heart rate. The heart rate can be obtained by electrocardiogram measurement, but as an easier and simpler method, it is known that the heart rate can be obtained by observing capillary vessels of a face through use of, for example, a Web camera. In addition, in regard to drowsiness during the work, it is known that the drowsiness can be grasped by observing pupils with a Web camera. The energy management system 100 continuously acquires the biometric data 418 from each user 130.

The analysis module 402 acquires, from the storage device 202, the biometric data 418 on the user 130 of the terminal 103 that has transmitted a piece of report data 500 indicating dissatisfied among pieces of report data 500. Then, the analysis module 402 determines for each type of biometric data 418 whether or not a difference value obtained by subtracting a second observed value from a first observed value has become equal to or larger than a positive threshold value, the second observed value being obtained earlier than the first observed value. For example, when the biometric data 418 is the heart rate obtained by observing the capillary vessels of the face, the difference value that has become equal to or larger than the positive threshold value indicates that tension of the user 130 is increasing.

Therefore, the energy management system 100 transmits the support information indicating that the tension is increasing to the terminal 103 of the user 130. Meanwhile, the difference value that has become equal to or smaller than a negative threshold value indicates that the degree of concentration of the user 130 has decreased or the user 130 has become drowsy. Therefore, the energy management system 100 transmits the support information indicating that the degree of concentration has decreased or the drowsiness has increased to the terminal 103 of the user 130.

When the type of biometric data 418 is the observed value of the vibration sensor provided on the seat surface of the chair in which the user 130 is seated, the observed value obtained within a predetermined range (for example, from 1 hertz to 4 hertz) indicates that the degree of concentration of the user 130 has decreased or that the fatigue of the user 130 has been accumulated. Therefore, the energy management system 100 transmits the support information indicating that the degree of concentration has decreased or the fatigue has been accumulated to the terminal 103 of the user 130.

In this manner, the energy management system 100 can grasp the degree of concentration, stress, and fatigue during the work and send those pieces of information as the support information, and can provide services that contribute to improvement of productivity by, for example, encouraging the users to rest for a certain period of time. In this case, the obtained biometric data 418 is acquired on demand, but this acquisition method is simple. The obtained biometric data 418 is desired to be analyzed by relative evaluation, and strictly provides information on the relative reduction of concentration, a significant increase in stress, and an increase in fatigue, instead of guaranteeing complete accuracy. The support information is provided to the user 130 in this manner, to thereby motivate the user 130 himself or herself to input the report data 500 and lead to promotion of the acquisition of the report data 500.

As described above, according to each of the first embodiment, the second embodiment, and the third embodiment, in order to optimize supply and demand of energy in an area in which introduction of a variable renewable energy is expanded, it is possible to provide an energy management service in which the energy is coordinated over the entire area based on the energy consumption on the consumer side with respect to the demand corresponding to varying renewable energies while enabling the comfortableness of the residents being consumers to be satisfied.

It should be noted that this disclosure is not limited to the above-mentioned embodiments, and encompasses various modification examples and the equivalent configurations within the scope of the appended claims without departing from the gist of this disclosure. For example, the above-mentioned embodiments are described in detail for a better understanding of this disclosure, and this disclosure is not necessarily limited to what includes all the configurations that have been described. Further, a part of the configurations according to a given embodiment may be replaced by the configurations according to another embodiment. Further, the configurations according to another embodiment may be added to the configurations according to a given embodiment. Further, a part of the configurations according to each embodiment may be added to, deleted from, or replaced by another configuration.

Further, a part or entirety of the respective configurations, functions, processing modules, processing means, and the like that have been described may be implemented by hardware, for example, may be designed as an integrated circuit, or may be implemented by software by a processor interpreting and executing programs for implementing the respective functions.

The information on the programs, tables, files, and the like for implementing the respective functions can be stored in a storage device such as a memory, a hard disk drive, or a solid state drive (SSD) or a recording medium such as an IC card, an SD card, or a DVD.

Further, control lines and information lines that are assumed to be necessary for the sake of description are described, but not all the control lines and information lines that are necessary in terms of implementation are described. It may be considered that almost all the components are connected to one another in actuality.

What is claimed is:

1. An energy management system, which is configured to control operations of air-conditioning facilities in a plurality of buildings, the energy management system comprising:
   a processor;
   a storage device, coupled to the processor, configured to store instructions; and
   an interface, coupled to the processor, communicable to/from a plurality of mobile terminals via a network,
   wherein the storage device is configured to store, for each of the plurality of buildings:
   first data indicating a relationship between the operation of each of the air-conditioning facilities and an energy consumption amount of each of the air-conditioning facilities,
   second data indicating an operational status of each of the air-conditioning facilities,
   third data indicating weather, and
   fourth data indicating warm and cold in the each of the plurality of buildings, and
   wherein the processor, upon executing the instructions is configured to:
   receive via the network, for each of the plurality of buildings, report data indicating a satisfaction feeling relating to warm and cold temperatures in a space of a user in the each of the plurality of buildings from each of the plurality of mobile terminals,
   calculate a percentage of satisfaction based on the report data for each of the plurality of buildings, the percentage of satisfaction representing a satisfaction feeling as a ratio of an estimated number of users who have expressed satisfaction to a number of users being a population in the space by a statistical method,
   create, for each of the plurality of buildings, a plan for operating each of the air-conditioning facilities based on the percentage of satisfaction and a predetermined target percentage of satisfaction,
   estimate a first energy consumption amount based on the first data, the first energy consumption amount indicating an estimated energy consumption amount based on an operation of each of the air-conditioning facilities in the plurality of buildings according to the created plan that is distributed to the each of the plurality of buildings via the network,
   calculate a second energy consumption amount based on the second data, the third data, and the fourth data, the second energy consumption amount being obtained after each of the air-conditioning facilities is operated after a lapse of a predetermined time period, and
   determine whether the first energy consumption amount is larger than the second energy consumption amount, and upon determining the first energy consumption amount is larger than the second energy consumption amount, control operation of the each of the air-conditioning facilities so as to achieve the second energy consumption amount.

2. The energy management system according to claim 1, wherein the processor is configured to:

select, when the first energy consumption amount is equal to or smaller than the second energy consumption amount, an energy-saving action corresponding to a difference between the first energy consumption amount and the second energy consumption amount; and transmit energy-saving action information for encouraging the selected energy-saving action to the plurality of terminals.

3. The energy management system according to claim 2, wherein the processor is configured to:

evaluate the energy-saving action based on a number of responses from the plurality of mobile terminals to which the energy-saving action information has been transmitted, the responses each indicating that the user has performed the energy-saving action, and select, upon determining the first energy consumption amount is equal to or smaller than the second energy consumption amount, based on an evaluation result of the energy-saving action, the energy-saving action corresponding to the difference between the first energy consumption amount and the second energy consumption amount.

4. The energy management system according to claim 1, wherein the processor is configured to calculate the percentage of satisfaction for each of the plurality of buildings based on a distribution between a number of pieces of report data indicating satisfaction as the satisfaction feeling and a number of pieces of report data indicating dissatisfaction as the satisfaction feeling.

5. The energy management system according to claim 1, wherein the storage device is configured to store, for each of the plurality of buildings, a plurality of operation patterns obtained by categorizing actual record data obtained by recording a temperature, a radiation temperature, a humidity, and a wind velocity in the each of the plurality of buildings, and wherein the processor is configured to select, for each of the plurality of buildings, a specific operation pattern as the plan from among the plurality of operation patterns based on the percentage of satisfaction and the predetermined target percentage of satisfaction.

6. The energy management system according to claim 1, wherein the processor is configured to:

acquire chronological biometric data of the user, generate, based on the chronological biometric data of the user of a specific terminal that has transmitted the report data indicating dissatisfaction as the satisfaction feeling, support information relating to usage of one of the plurality of buildings for the user of the specific terminal, and transmit the support information to the specific terminal.

7. An energy management method, which is executed by an energy management system configured to control an operation of an air-conditioning facility in a building, the energy management system comprising:

a processor;

a storage device, coupled to the processor, configured to store instructions; and an interface, coupled to the processor, communicable to/from a plurality of mobile terminals via a network, wherein the storage device is configured to store:

first data indicating a relationship between the operation of the air-conditioning facility and an energy consumption amount of the air-conditioning facility, second data indicating an operational status of the air-conditioning facility, third data indicating weather, and fourth data indicating warm and cold temperatures in the building, the energy management method comprising:

receiving via the network, by the processor, report data indicating a satisfaction feeling relating to warm and cold temperatures in a space of a user in the building from each of the plurality of mobile terminals;

calculating, by the processor, a percentage of satisfaction based on the report data, the percentage of satisfaction representing the satisfaction feeling as a ratio of an estimated number of users who have expressed satisfaction to a number of users being a population in the staying space by a statistical method;

creating, by the processor, a plan for operating the air-conditioning facility based on the percentage of satisfaction and a predetermined target percentage of satisfaction;

estimating, by the processor, a first energy consumption amount based on the first data, the first energy consumption amount indicating an estimated energy consumption amount based on an operation of the air-conditioning facility according to the created plan;

calculating, by the processor, a second energy consumption amount based on the second data, the third data, and the fourth data, the second energy consumption amount being obtained after the air-conditioning facility is operated after a lapse of a predetermined time period; and determining whether the first energy consumption amount is larger than the second energy consumption amount, and upon determining the first energy consumption amount is larger than the second energy consumption amount, controlling, by the processor, operation of the air-conditioning facility so as to achieve the second energy consumption amount.

* * * * *